United States Patent [19]
Butler

[11] 4,077,540
[45] Mar. 7, 1978

[54] RECEPTACLE CARRIAGE, DISPENSER AND DISCHARGE DEVICE

[76] Inventor: Donald L. Butler, Rte. 4, Box 424, Ft. Myers, Fla. 33905

[21] Appl. No.: 722,405

[22] Filed: Sep. 13, 1976

[51] Int. Cl.$^2$ .......................... B65G 59/10; B65B 5/10
[52] U.S. Cl. ...................................... 221/297; 53/391; 214/8.5 K
[58] Field of Search ................. 53/235, 244, 250, 391; 56/328 R; 214/8.5 K; 221/221, 223, 268, 272, 289, 290, 292, 293, 297

[56] References Cited

U.S. PATENT DOCUMENTS

| 3,633,336 | 1/1972 | Rempel | 53/391 |
| 3,981,127 | 9/1976 | Smith | 56/328 R |

FOREIGN PATENT DOCUMENTS

| 1,024,886 | 4/1966 | United Kingdom | 214/8.5 K |

*Primary Examiner*—Robert Louis Spruill
*Attorney, Agent, or Firm*—Alfred E. Wilson

[57] ABSTRACT

The present invention pertains to a device which normally supports a plurality of relatively large receptacles thereatop in a stacked, nested relation to a receptacle carriage and dispenser frame. When the carriage and dispenser frame is actuated in a first direction, the stack is conditioned to permit the lowermost receptacle to be dispensed downwardly onto a support frame. Actuation of the carriage and dispenser frame in a second direction dispenses the lowermost receptacle onto the support frame which is simultaneously elevated to a position to be filled with a product such as fruit from a conveyor. Subsequent actuation of the carriage and dispenser frame in the first direction lowers the support frame to discharge the receptacle thereon onto the ground and simultaneously reconditions the balance of the stack to discharge the lowermost container thereof on the next operation of the carriage and dispenser frame in the second direction.

8 Claims, 8 Drawing Figures

RECEPTACLE CARRIAGE, DISPENSER AND DISCHARGE DEVICE

BACKGROUND OF THE PRESENT INVENTION

The present invention pertains to a receptacle carriage, dispenser and discharge device and more particularly to a device of this nature which forms a portion of a mobile unit used in harvesting fruit, for example. The mobile unit may be comprised of a tow vehicle carrying a boom, operably carrying a device for dislodging fruit, oranges for example, from grove or orchard trees, and a conveyor trailer, hitched to the tow vehicle and including means to catch the fruit dislodged from the trees and to convey it onto a conveyor carried by the trailer for discharge into receptacles, sequentially positioned, as needed, relative to the rear end of the trailer conveyor.

A frame, which may comprise the rear end portion of the trailer, carries a substantial plurality of stacked, nested receptacles thereatop. An arrangement of slide members, operated by a fluid operated means such as a pair of coacting hydraulic cylinders wherein piston and piston rod assemblies support the stack of receptacles in a position for sequential discharge of the lowermost receptacle onto a lower frame in a position to receive the fruit deposited on the trailer conveyor. The piston rod is interconnected with the lower frame in a manner whereby proper sequential operation of the piston rod between retracted and extended positions lowers the lower frame to deposit a receptacle filled with fruit onto the ground and, after the mobile unit is advanced a distance beyond the filled basket, raises the lower frame and simultaneously drops the lower receptacle from the stack into position on said lower frame for reception of the fruit from the trailer conveyor, which is stopped during the transfer of receptacles.

This sequential discharge of filled receptacles and dispensing of empty receptacles into a position to receive the fruit progresses in a very rapid order as the harvesting operation progresses along the rows of trees in a fruit grove or orchard.

Therefore, one of the principal objects of the present invention is to provide a receptacle carriage, dispenser and discharge device which forms a portion of a mobile unit used in a harvesting operation, for example, of fruit of the citrus variety.

Another principal object of this invention is to provide a device of this nature which carries a substantial plurality of stacked, nested receptacles thereatop;

A further object of the invention is to provide means to selectively dispense the lowermost receptacle from the stack into a lower supported position to receive fruit from a conveyor which is carried by a trailer, attached to a tow vehicle.

Another object of the instant invention is to provide means to selectively discharge a filled receptacle from the device.

A still further object of the present invention is to provide operating means, interconnected between the receptacle dispenser means and a lower support means, whereby the receptacles may be sequentially dispensed into a position on said support means for filling purposes and discharged in a filled condition.

DETAILED DESCRIPTION OF THE DRAWINGS

Figure 1:
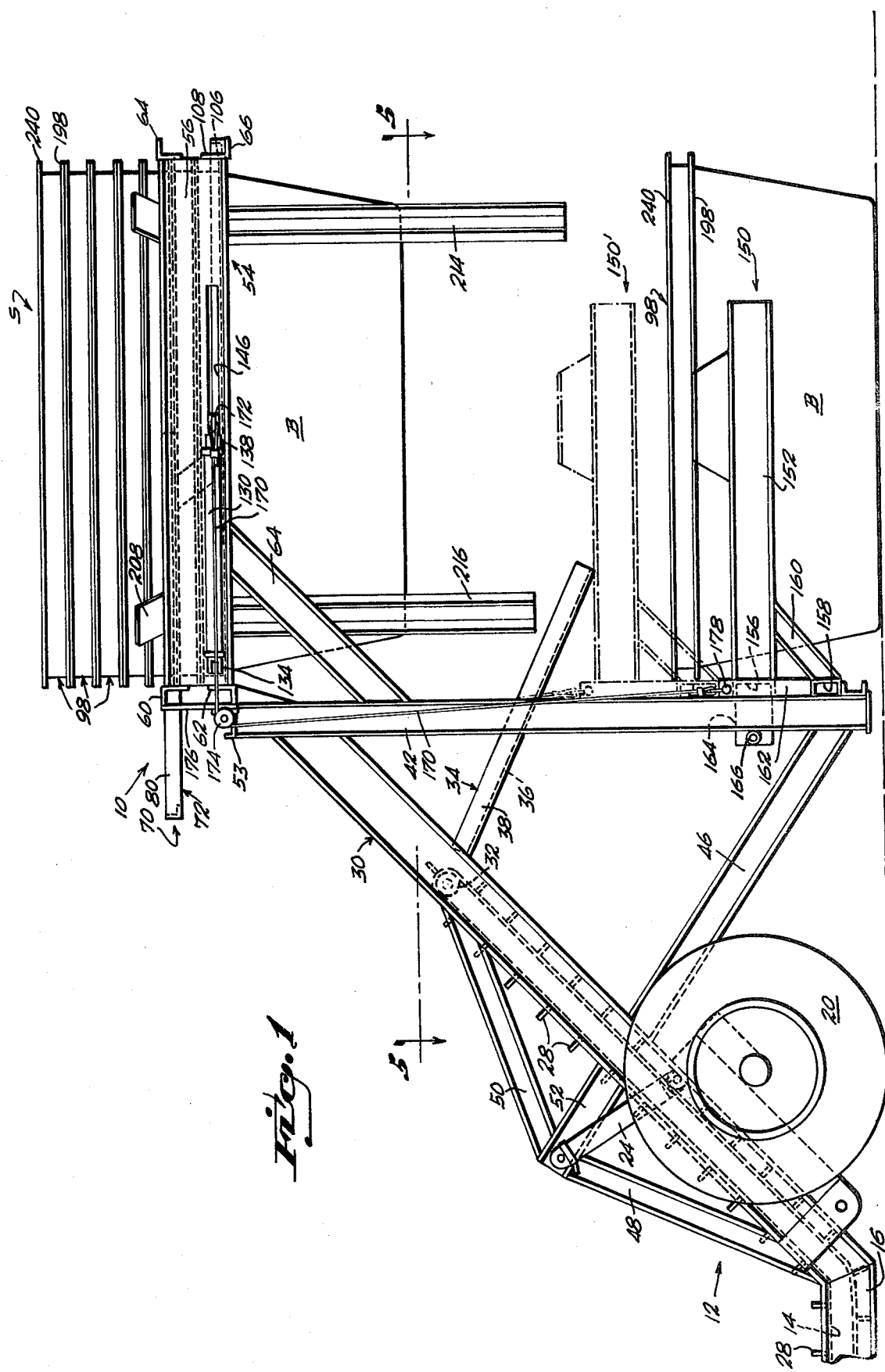
FIG. 1 is a side elevational view of the receptacle carriage, dispenser and discharge device of the present invention.
Figure 2:
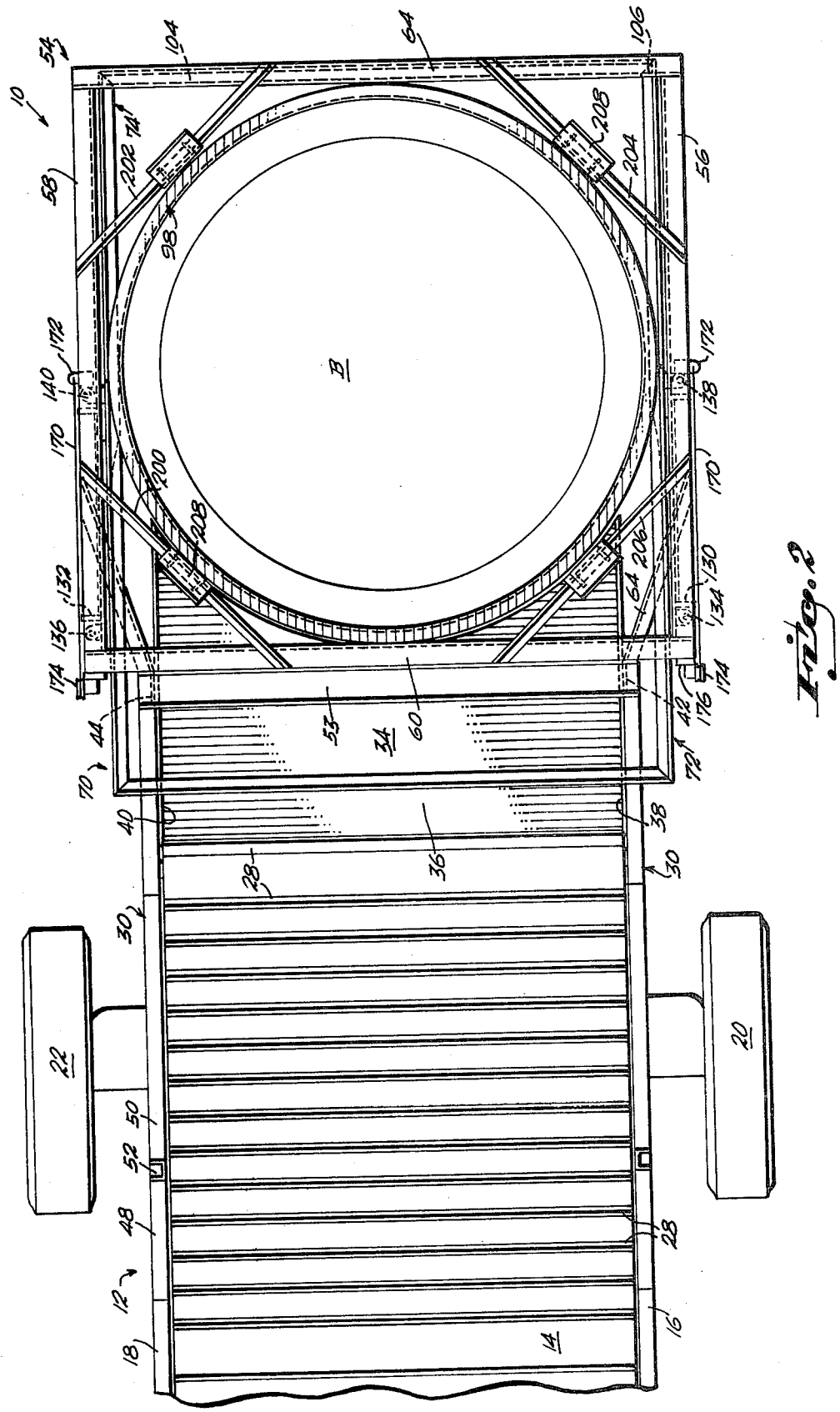
FIG. 2 is a top plan view of FIG. 1.

With reference to the drawings in which like reference characters designate like or corresponding parts throughout the plurality of views and with particular reference to FIGS. 1 and 2, the receptacle carriage, dispenser and discharge device of the present invention is designated generally at 10 in a rigidly fixed relation to the rear end of a conveyor trailer 12. While the conveyor trailer 12 forms no part of the present invention, it will be described briefly in regard to its association with the device of the present invention.

In use, the conveyor trailer 12 is hitched to a tow vehicle, not shown, equipped with a universally operable boom, operably carrying a device for engagement in a fruit tree to dislodge the fruit therefrom. Fruit catch means, not shown, are operably connected to the conveyor trailer 12 to move the fruit laterally onto the trailer conveyor 14 for longitudinal movement for disposal in a receptacle, properly positioned in the device of this invention.

With further reference to FIGS. 1 and 2, the trailer conveyor 14 is operably supported between a pair of side rails 16 and 18 supported between wheels 20 and 22. Hydraulically operated lever means at the front and rear ends of the trailer are operable to vertically raise the level of the conveyor trailer 12 from the lowered "in use" position illustrated in FIG. 1 to a higher elevation for movement through fields as well as for "over-the-road" travel.

One of the hydraulic cylinder and piston devices and levers 24 and 26 are illustrated in FIG. 1. It should be noted that the elevation above ground level of the receptacle carriage, dispenser and discharge device of this invention changes with the trailer 12.

The trailer conveyor 14 includes a plurality of transverse, spaced apart, vertically extending flights 28 to move the fruit, such as oranges, towards the rear of the trailer 12. Adjacent the rear end thereof, the side rails 16 and 18 are angled upwardly and rearwardly as at 30. The conveyor 14 angles upwardly with the side rails to a terminal idler drum 32 where the fruit traveling thereon is discharged onto a downwardly, rearwardly angled chute 34 comprised of a base portion 36 with upwardly turned, opposed side flanges 38 and 40. Chute 34 is fixed between a pair of side, vertically extending beams, such as channel irons 42 and 44 which are in turn fixed to the upper, extended ends of the angled portions 30 of side rails 16 and 18. The lower ends of vertical channel irons 42 and 44 are connected to angled portions 30 by a pair of lower, forwardly, upwardly angled beams such as 46. A pair of truss members 48 and 50 are fixed between a forwardly extended end 52 of each beam 46 and one of the side rails 16 and 18.

The upper ends of the vertical side beams 42 and 44 are interconnected by a transverse beam 53 which may also be in the form of a channel iron. Attached relative to the rear top edge of the assembly, comprised of vertical beams 42 and 44 and top beam 53 is a generally rectangular, horizontally extending support frame 54.

Frame 54 is comprised of a pair of spaced apart side, outwardly opening channel beams 56 and 58 connected at their respective pairs of ends by front and rear pairs of upper and lower angle irons 60, 62 and 64, 66. Frame 54, so formed, is fixed as by welding along the rearward extended edge of angle iron 62 to the top beam 53. Diagonal truss members such as 64 are fixed between the vertical beams 42 and 44 and the respective side beams 56 and 58.

Figure 3:
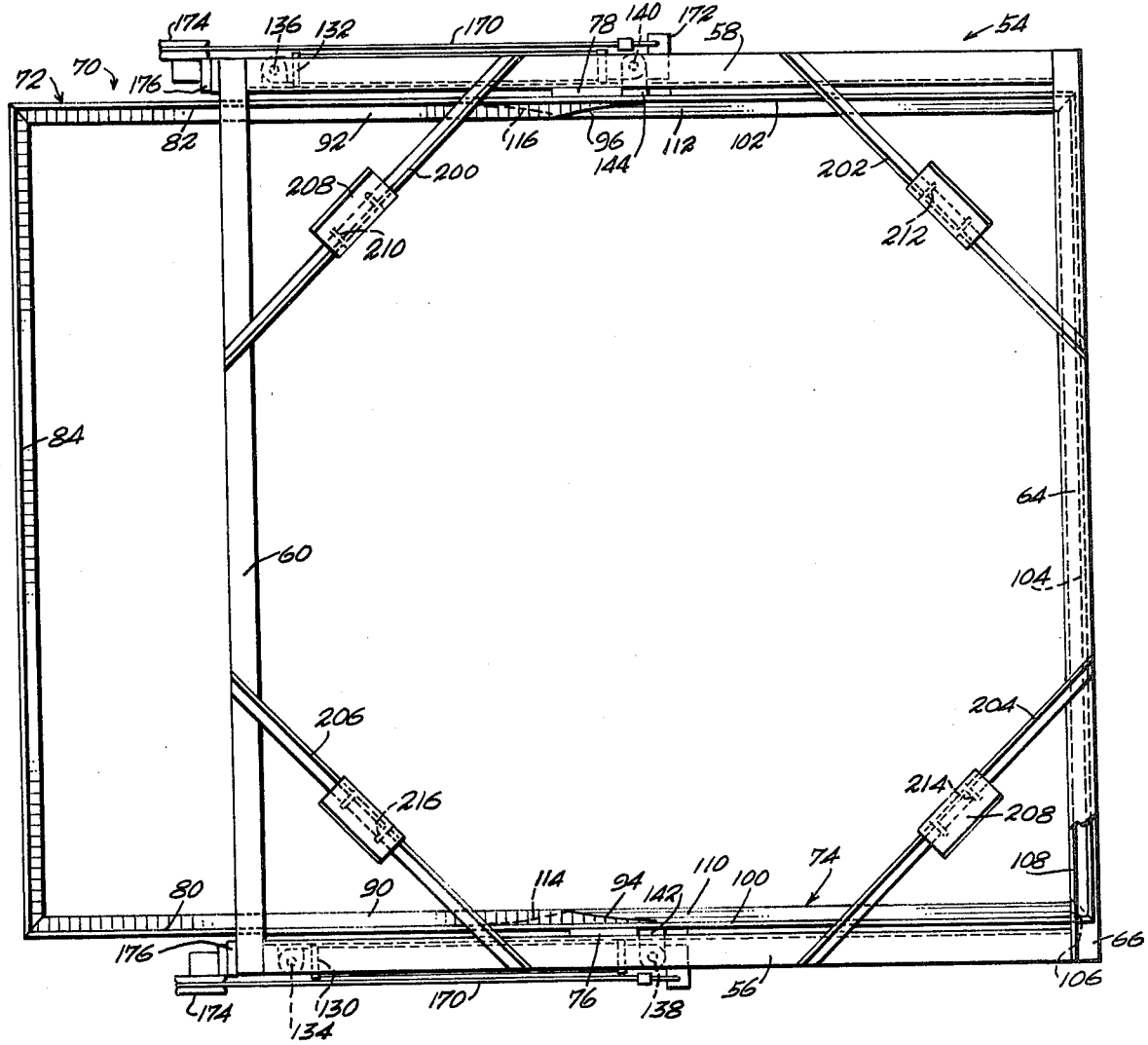
FIG. 3 is an enlarged top plan view of the container carriage and dispenser.
Figure 4:
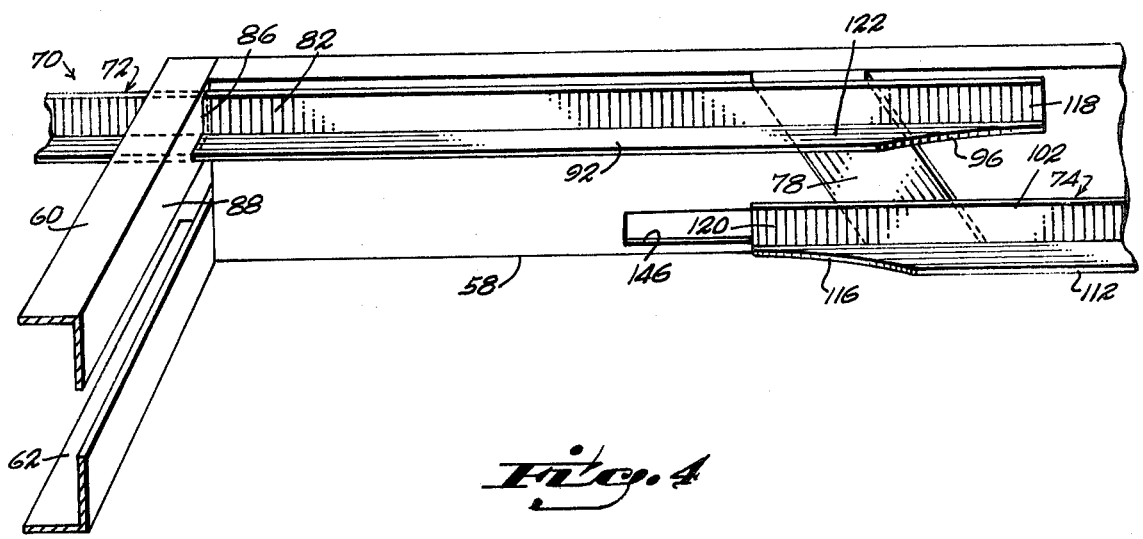
FIG. 4 is a fragmentary perspective view of the container carriage and dispenser.

A receptacle carriage and dispensing frame 70 is slidably engaged through the support frame 54 as best illustrated in FIGS. 3 and 4. Frame 70 is generally comprised of a forward, top, rearwardly opening U-shaped portion 72, and a rearward, bottom forwardly opening U-shaped portion 74 connected to portion 72 by a pair of generally upwardly angled side connector plates 76, 78.

The forward, top, rearwardly opening U-shaped portion 76 is comprised of a pair of rearwardly extending side angle irons 80, 82, interconnected at their forward ends by a transverse member 84. As best illustrated in FIG. 4, each side angle iron such as 82 is slidably engaged through an appropriate L-shaped slot 86 through the vertical flange 88 of the upper, forward angle iron 60. Side angle irons 80 and 82 are disposed so as to provide opposed inwardly extending lower flanges 90 and 92 with alike rear end arcuate cutout portions 94 and 96. Said portions 94 and 96 are cut out and spaced apart in conformity with the outer diameter of a top annular, outwardly opening channel rim 98 of a receptacle such as the baskets B.

The rearward, bottom, forwardly opening U-shaped portion 74 is comprised of a pair of forwardly extending side angle irons 100 and 102, interconnected at their rearward ends by a transverse member 104. Each side angle iron 100 and 102 is slidably engaged through an L-shaped slot 106 in the vertical flange 108 of the lower rearward angle from 66 in the same manner as described relative to the upper side angle iron 82 relative to the upper, forward angle iron 60. Like angle irons 80 and 82 of U-shaped portion 76, the angle irons 100 and 102 include opposed inwardly extending lower flanges 110 and 112 with alike forward end cutout portions 114 and 116 which are in an opposed relation to the respective cutout portions 94 and 96 in flanges 90 and 92. 114 and 116 are also cut out and spaced apart in conformity with the outer diameter of the top annular, outwardly opening channel iron rim 98 of baskets B.

As illustrated in FIG. 4, it can be seen that the extended end portions 118 and 120 of each pair of angle irons such as 82 and 102 are of such lengths so as to overlap a distance substantially greater than the length of one cutout 96 or 116. Therefore, a full width lever flange portion 122 of the upper, forward angle iron 82 overlies a very substantial portion of the length of cutout portion 116 in the lower flange 112 of lower angle iron 102. The overlapping end portions 118 and 120 are rigidly connected by the plates 76, 78.

Figure 6:
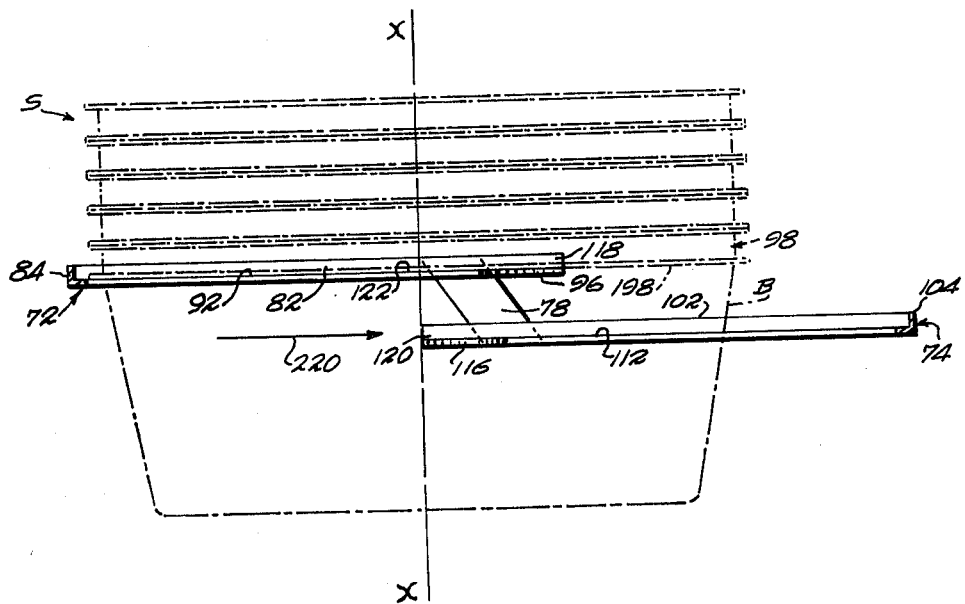
FIGS. 6, 7 and 8 are a series of schematic views illustrating the sequential operation of a support and dispenser frame, which is slidably engaged through the top portion of the container carriage.
Figures 7, 8:
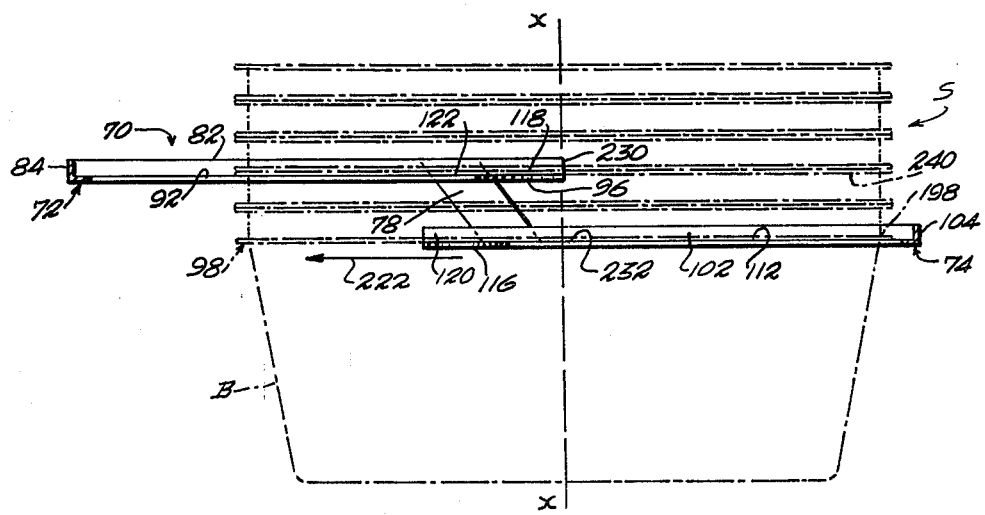

A pair of co-acting hydraulic cylinder, piston and piston rod assemblies 130 and 132 are pivotally connected at one end at 134 and 136 to the forward end of the respective side beams 56 and 58 of support frame 54. The extended ends of the piston rods of the assemblies 130 and 132 are pivotally connected at 138 and 140 to ears 142 and 144 extending through elongated slots such as 146 in the respective side beams 56 and 58 to points of fixed attachment to the respective sides of the carriage and dispensing frame 70. Consequently, operation of the co-acting hydraulic assemblies 130 and 132 to move the piston rods thereof between retracted and extended positions will impart a reciprocating movement to the carriage and dispensing frame 70 as schematically illustrated in FIGS. 6, 7 and 8 for a purpose to be hereinafter described.

Figure 5:
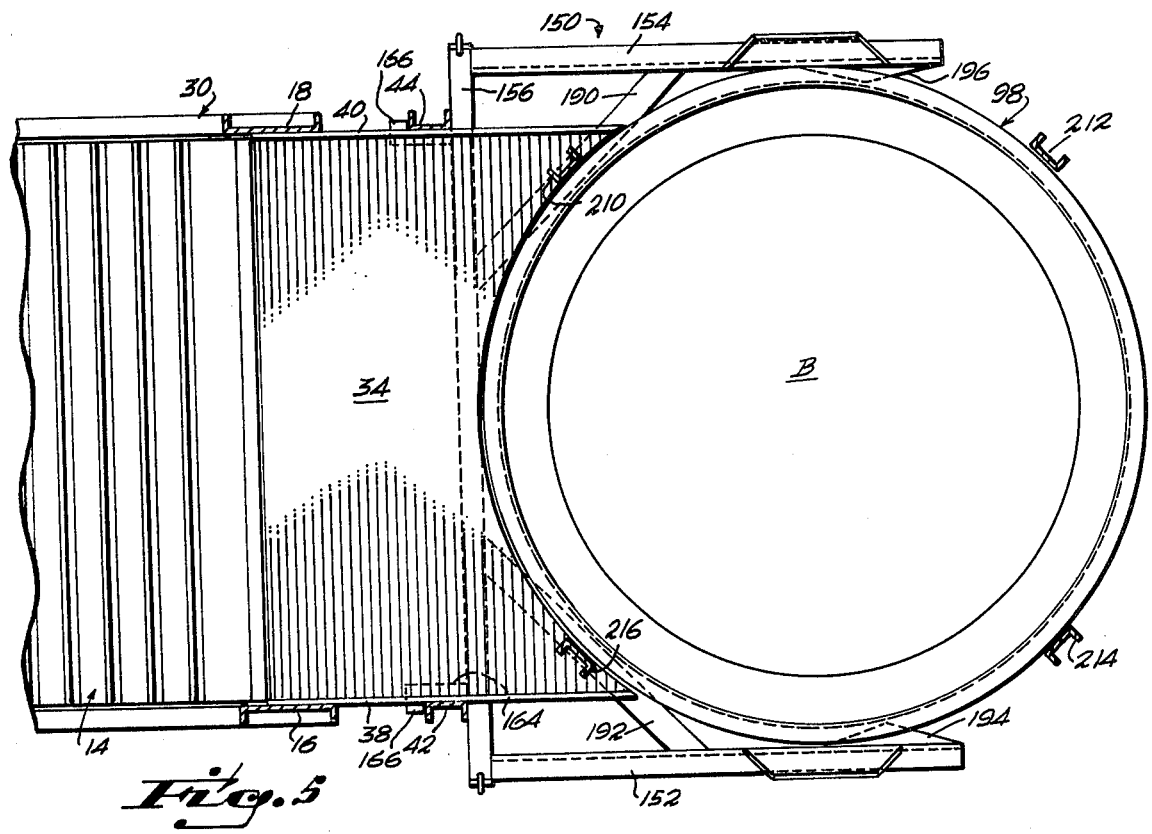
FIG. 5 is a horizontal sectional view taken along the line 5—5 of FIG. 1.

With particular reference to FIGS. 1 and 5, a generally C-shaped frame 150, comprised of a pair of spaced apart side rails 152 and 154 and a transverse rail 156 connecting between the forward end thereof, is disposed for vertical movement along the vertical beams 42 and 44. For this purpose a second transverse rail 158, disposed in a spaced parallel relation below transverse rail 156, is rigidly fixed to side rails 152 and 154 by a pair of diagonal truss members such as 160, and a pair of vertical side members such as 162 are fixed in a vertical spanning relation between the respective ends of transverse rails 156 and 158 in sliding engagement with the rear faces of the vertical beams 42 and 44. A forwardly extended plate such as 164, from each end of transverse rail 156, extends across the inside face of one of the vertical beams such as 42 and carries a roller means 166 on the forward end portion thereof in engagement along the forward face of vertical beam 42.

The C-shaped frame 150 as seen in FIG. 1, is movable between the lower, full-line position 150 and an upper, dot-dash position 150', for a purpose to be hereinafter described. This movement is accomplished by the operation of the pair of co-acting hydraulic assemblies 130 and 132. To this end, a cable 170 is fixed at a first end to a lug 172 carried by the outer end of the piston rod of each hydraulic assembly 130 and 132. From this lug 172, each cable 170 passes forwardly around a pulley 174 carried on a vertical plate 176 fixed relative to one end of the pair of angle irons 60, 62. From the pulley 174, each cable 170 passes downwardly to a point of attachment 178 at its second end to one side of the C-shaped frame 150. Therefore, it can be seen that the frame 150 is disposed in the down, full line position in FIG. 1 with the piston rods of the hydraulic assemblies 130 and 132 in their retracted positions. When the piston rods are operated to extended positions, the cables 170 are actuated to pull the C-shaped frame to the elevated, dot-dash line position 150'.

As best illustrated in FIGS. 1 and 2, a nested stack S of baskets B is disposed in position relative to the carriage and dispensing frame 70 in a position axially above the C-shaped frame 150.

As illustrated in FIG. 5, a pair of diagonal truss members 190, 192, connecting between the upper transverse rail 156 and the respective side rails 152 and 154, cooperate with a pair of generally triangular inward projections 194, 196 adjacent the rear ends of side rail 152, 154 to supportingly engage the underside of the bottom flange 198 of the annular channel rim 98 of a basket B disposed on frame 150.

With reference to FIGS. 2 and 3, four diagonal corner strips 200, 202, 204 and 206 are disposed across the upper side of the four corners of the support frame 54. An upwardly, outwardly angled stack positioning plate 208 is centrally fixed relative to each diagonal corner strip 200 through 206 to guide a stack S of baskets B into the position illustrated in FIG. 1. Four downwardly extending vertical guide rails 210, 212, 214 and 216 are fixed at their upper ends to the underside of the respective diagonal corner strips 200 through 206, in alignment with the respective guide plates 208, to guide a basket B, released from the bottom of the stack S, onto the C-shaped frame 150, FIGS. 5 and 8, in a manner to be subsequently described.

OPERATION OF THE DEVICE

In operation, a stack of nested baskets B may be disposed on the receptacle carriage and dispensing frame 70 in the position of FIG. 6. In In this position, the piston rods of the hydraulic assemblies 130 and 132 will be extended as indicated by arrow 220. A portion of the underside of the bottom flange 198 of the channel rim 98 of the lowermost basket B of stack S, across the transverse diameter, represented by line X—X, will rest on the lower flange areas 122 of the upper, forward angle irons 80 and 82, thereby supporting the entire nested stack S.

As the stack S is restrained against movement by vertical guide rails 210, 212, 214 and 216, operation of the piston rods to retracted positions, indicated by arrow 222 in FIG. 7, causes the frame 70 to slide relative to channel rim 98 of the lowermost basket B of the stack S until the arcuate cutouts 94 and 96 are disposed in registration with the outer diameter of the channel rims 98 of the stack S of baskets B. In this position the leading ends 230 of angle irons 80 and 82 are disposed substantially along line X—X. With further reference to FIG. 7, the entire stack S drops to a rest position in a spanning relation across the bottom flange areas 232 of the rear, bottom angle irons 100 and 102.

Referring to FIG. 8, when the piston rods of hydraulic assemblies 130 and 132 are reactivated to retracted positions, indicated by arrow 234, the arcuate cutouts 114 and 116 of lower flanges 110 and 112 of the rear bottom angle irons 100 and 102 are moved into registration with the outer diameter of the channel rim 98 of the lowermost basket B of stack S, permitting it to drop along a guided vertical path to a rest position atop the C-shaped frame 150. Simultaneously, the lower flanges 90 and 92 are advanced into engagement under the top flange 240 of the rim 98 of the next-to-bottom basket B, thereby supporting the remainder of stack S on the areas 122 of the lower flanges 90 and 92 of forward, upper angle irons 80 and 82. The next-to-bottom basket thereby becomes the bottom basket B of the remainder of stack S.

The dispensed basket B' on the C-shaped frame 150, which is also simultaneously moved to the upper position of FIG. 1, is thereby positioned to receive fruit from the trailer conveyor 14 by means of the chute 34. When the basket B' is filled with fruit, the hydraulic assemblies 130 and 132 are reactivated to retract the piston rods. The C-shaped frame is thereby lowered to deposit the basket B' on the ground and to simultaneously drop the balance of the stack S to the position of FIG. 7 in the manner above described. The mobile unit is then moved away from the filled basket on the ground by means of the tow vehicle. Thereafter, operation of the piston rods to extended positions will simultaneously raise the C-shaped frame 150 to the upper position and drop the lowermost basket B from the balance of stack S into position on frame 150 as in FIG. 8. The operation thereafter proceeds in the manner above described relative to FIGS. 7 and 8.

It should be noted that the nested stack S may be initially disposed or loaded directly onto the flanges 110, 112 of angle irons 100 and 102 as in FIG. 7 in which event the operation above described relative to FIG. 6 will be omitted. However, the last basket of a stack S will be dispensed in the condition existing in FIG. 8 and a new stack S may be positioned on the carriage and dispenser frame 70 while in this condition as shown in FIG. 6 or said frame 70 may be shifted to the position of FIG. 7 while empty and then loaded with another stack S. FIG. 7, therefore, illustrates a support condition for the receptable stack from which the dispensing operation is initiated.

I claim:
1. A receptacle carriage, dispenser and discharge device comprising,
   a main frame including vertical support means and an upper, generally rectangular, horizontally extending support frame,
   means to support said main frame,
   a generally horizontally extending receptacle carriage and dispenser frame slidably engaged through said upper support frame,
   manually controlled means to drive said receptacle carriage and dispenser frame for movement between first and second positions,
   means in said receptacle carriage and dispenser frame to cooperate with a pair of outwardly extending top rim flanges on each one of a nested stack of receptacles, disposed on said carriage and dispenser frame in said first position, whereby operation of said means to drive will sequentially cause the lowermost receptable in the stack to be released to drop downwardly on each movement of said carriage and dispenser frame to said second position, while holding the balance of said stack, and, on each of said movements back to said first position will position the next lowermost receptacle for release on the subsequent movement back to said second position, a rearward opening, generally C-shaped, horizontally extending frame, beneath and in vertical alignment with said stack when said receptacle carriage and dispenser frame is in said second position, said manually controlled means to drive comprising a hydraulic cylinder, piston and piston rod assembly, operably, pivotally connected between each forward end of said extending support frame and one side of said receptacle carriage and dispenser frame to provide the movement of said carriage and dispenser frame between said first and second positions, drive means interconnected between said C-shaped frame and receptacle carriage and dispenser frame whereby said C-shaped frame is simultaneously moved to said raised position when said carriage and dispenser frame is driven from said first to second position, and moved to said lowered position when said carriage and dispenser frame is driven from said second to first position, and wherein said interconnected drive means comprises a cable, fixed at a first end to a distal end portion of each of said piston rods and extending forwardly around a pulley carried by one side of said extending support frame and then downwardly to a point of attachment to said slide means.

2. A receptacle carriage, dispenser and discharge device comprising,
  a main frame including vertical support means and an upper, generally rectangular horizontally extending support frame,
  means to support said main frame,
  a generally horizontally extending receptacle carriage and dispenser frame slidably engaged through said upper support frame,
  manually controlled means to drive said receptacle carriage and dispenser frame for movement between first and second positions,
  means in said receptacle carriage and dispenser frame to cooperate with a pair of outwardly extending top rim flanges on each one of a nested stack of receptacles, disposed on said carriage and dispenser frame in said first position, whereby operation of said means to drive will sequentially cause the lowermost receptacle in the stack to be released to drop downwardly on each movement of said carriage and dispenser frame to said second position, while holding the balance of said stack, and, on each of said movements back to said first position will position the next lowermost receptacle for release on the subsequent movement back to said second position, and wherein said rectangular, horizontally extending support frame is comprised of a pair of spaced apart, side, outwardly opening channel beams connected at respective front and rear transverse connector means, and wherein said carriage and dispenser frame is generally rectangular in configuration, and wherein said carriage and dispenser frame is comprised of a forward, top, rearwardly opening U-shaped portion, slidably engaged through a first slot means in said front transverse connector means, a rearward, bottom, forwardly opening U-shaped portion, slidably engaged through a second slot means in said rear transverse connector means, and a pair of generally upwardly extending plates rigidly connecting between said forward and rearward U-shaped portion.

3. The receptacle carriage, dispenser and discharge device as defined in claim 2 wherein said forward, top rearwardly opening U-shaped portion is comprised of a pair of side, parallel angle members, slidably engaged through said first slot means and interconnected at their forward ends by a transverse member, forwardly of said support frame.

4. The receptacle carriage, dispenser and discharge device as defined in claim 3 wherein said rearward, bottom, forwardly opening U-shaped portion is comprised of a pair of side, parallel angle members, slidably engaged through said second slot means and interconnected at their rearward ends by a transverse member, rearwardly of said support frame.

5. The receptacle carriage, dispenser and discharge device as defined in claim 2 wherein each of said pairs of side, parallel, angle members is disposed so as to provide opposed, inwardly turned, co-planar flanges.

6. The receptacle carriage, dispenser and discharge device as defined in claim 5 wherein oppositely extending end portions of said pairs of top and bottom, side, parallel angle members are disposed in respective vertically spaced apart, aligned, overlapping relations.

7. The receptacle carriage, dispenser and discharge device as defined in claim 6 wherein said means in said receptacle carriage and dispenser frame comprises alike, oppositely facing arcuate cutout portions in each pair of said inwardly turned upper and lower flanges in said overlapping end portions, said pairs being formed in an opposed relation to each other; a full width portion of each of said top flanges overlying a major portion of the vertically opposite lower cutout portion and a full width portion of each of said lower flanges underlying a major portion of the vertically opposite upper cutout portion.

8. The receptacle carriage, dispenser and discharge device as defined in claim 7 wherein said arcuate cutouts in each pair of said inwardly turned flanges are curved outwardly, in general conformity with the outer periphery of the basket rim flanges, to terminal ends at the distal ends of each of said pairs of flanges, the spacing between said terminal ends being at least equal to the transverse outer diameter of the rim flanges.

* * * * *